United States Patent [19]

Kupperman et al.

[11] 4,165,061

[45] Aug. 21, 1979

[54] INTEGRALLY FORMED MOLDING UNIT FOR FREEZING A LIQUID WITH A PORTION OF THE UNIT SEVERABLE FOR FORMING A HANDLE FOR THE FROZEN PRODUCT

[75] Inventors: Sam Kupperman, Chicago; Dennis Kupperman, Glenview, both of Ill.

[73] Assignee: RB Toy Development Co., Skokie, Ill.

[21] Appl. No.: 777,325

[22] Filed: Mar. 14, 1977

Related U.S. Application Data

[63] Continuation-in-part of Ser. No. 626,654, Oct. 29, 1975, abandoned.

[51] Int. Cl.² .......................... A23G 9/00; B22D 5/00
[52] U.S. Cl. .................................. 249/92; 249/91; 249/93; 425/DIG. 59; 425/DIG. 109
[58] Field of Search .............. 249/92, 96, 97, 91, 249/93, 52, 58, 127; 425/DIG. 109, DIG. 42, DIG. 59; 206/820

[56] References Cited

U.S. PATENT DOCUMENTS

| 707,352 | 8/1902 | Pope et al. | 249/96 |
|---|---|---|---|
| 2,148,079 | 2/1939 | Martin, Jr. | 249/52 |
| 2,151,282 | 3/1939 | Stamp | 249/96 |
| 2,724,867 | 11/1955 | Smith | 425/DIG. 109 |
| 2,784,684 | 3/1957 | MacLean | 249/96 |
| 3,462,035 | 8/1969 | Grussen | 220/94 A |
| 3,704,779 | 12/1972 | Nigg | 206/820 |

FOREIGN PATENT DOCUMENTS

| 1576790 | 8/1969 | France | 220/94 A |
|---|---|---|---|
| 736912 | 9/1955 | United Kingdom | 220/94 A |

*Primary Examiner*—William R. Briggs
*Attorney, Agent, or Firm*—Vogel, Dithmar, Stotland, Stratman & Levy

[57] ABSTRACT

A molding unit for forming a frozen liquid confection and the like comprising a container of molded or a plastic material and integrally molded with a ring-like member, which ring-like member is readily severable from the container and positioned between posts or pins on the container so that a portion of the ring-like member extends into the container to be frozen into and embedded in the frozen product with a portion of the ring-like member extending exteriorly so that it may be grasped and used as a handle to hold the finished frozen product.

1 Claim, 9 Drawing Figures

INTEGRALLY FORMED MOLDING UNIT FOR FREEZING A LIQUID WITH A PORTION OF THE UNIT SEVERABLE FOR FORMING A HANDLE FOR THE FROZEN PRODUCT

RELATED APPLICATIONS

This is a continuation-in-part application of our co-pending patent application Ser. No. 626,654, filed Oct. 29, 1975 now abandoned.

BRIEF SUMMARY OF THE INVENTION

This invention relates to a molding unit for freezing a liquid, which frozen liquid may serve as a frozen confection product which has been flavored and in which the molding unit is integrally formed of a plastic material so that a portion thereof may be removed from the integral unit and used to be frozen into the frozen liquid with a portion thereof extending exteriorly thereof to be used as a handle for holding the frozen product. Alternate methods of positioning the handle after removal from the as molded article are disclosed.

Another object of this invention is to provide a molding unit integrally formed and so constructed that the annular ring formed with said unit is readily severable and removable and used as the means to which the liquid is frozen, whereby same serves as a handle for the frozen product.

Another object of this invention is to provide an integrally formed molding unit made of plastic which may be economically produced and which provides a severable handle to be frozen to the frozen confection.

Another object of this invention is to provide a molding unit which is economical to produce and which does not require packaging as the design and construction of the unit will not hook together and which provides a reuseable, one-piece handle.

These and other objects of the present invention may more readily be understood by reference to the following drawings, in which:

DESCRIPTION OF THE PREFERRED EMBODIMENT

Figure 1:
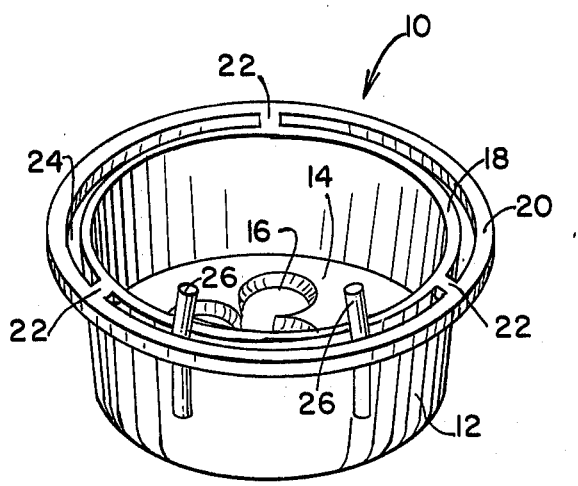
FIG. 1 is a perspective view of the one-piece molding unit forming this invention.
Figure 2:
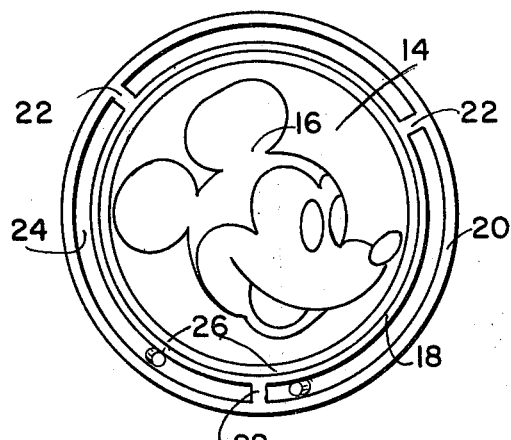
FIG. 2 is a top plan view of FIG. 1.
Figure 4:
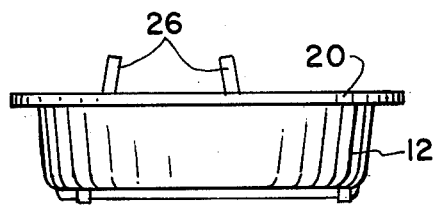
FIG. 4 is a side elevational view.
Figure 5:
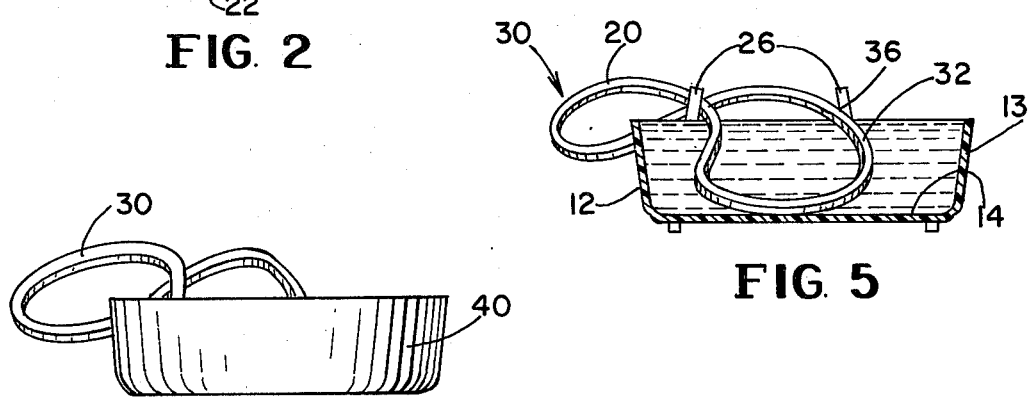
FIG. 5 is a view partly in cross section showing the position of the handle, the same as being frozen in the liquid.

The molding unit is integrally formed or molded of a plastic material, preferably polyethylene, and same is best shown as an integral unit in FIGS. 1 and 2 of the drawings. The molding unit, generally indicated at 10, comprises an annular cup-shaped member or container, indicated generally by the numeral 12, having an inwardly inclined annular wall 13 with a bottom wall 14 on which is formed in relief any desired configuration or comic character indicated by the numeral 16. The annular wall 13 inclines inwardly from the top towards the bottom, as best seen in FIG. 5. The cup-shaped member or container is open at the top and has a top annular edge 18. Molded integrally with the cup-shaped member or container is an annular or ring-like member 20 which is spaced outwardly from the top annular edge 18 of the cup-shaped member or container but is connected at the top thereof by spaced short horizontal connecting strips 22. The annular or ring-like member 20 is generally square or rectangular in transverse cross section and the top of the ring-like member 20 is on the same horizontal plane as the top edge 18 of the container. The ring-like member 20 may also be round in cross section. The spaced connecting strips 22 between the container and the ring-like member provide a plurality of spaces 24 between the vertical wall of the container and the inner surface of the ring-like member 20.

Also formed integrally with the body of the container or cup are a pair of spaced, inclined pins or posts indicated by the numeral 26; said posts are not attached to the ring-like member but are integrally formed with the cup-shaped member or container 12. The posts or pins are inclined at an angle of approximately 10 degrees and are inclined towards each other at the top.

Figure 3:
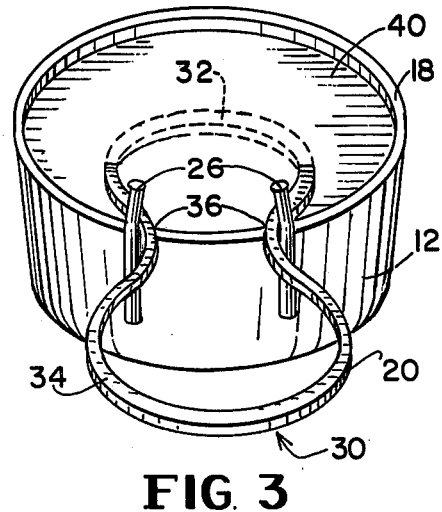
FIG. 3 is a view with the ring removed from that of FIG. 1 and with said ring positioned between the spaced posts to form a handle for the frozen confection.
Figure 6:
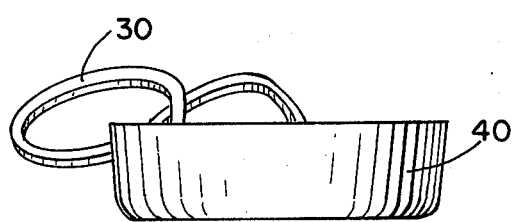
FIG. 6 is a view of the frozen liquid, such as a confection, with the handle attached thereto, the same having been removed from the container or cup forming the mold.

The molding unit as shown in FIGS. 1 and 2, is integrally molded by injection molding and is inexpensively produced. In this manner, the integrally formed molding unit does not require separate packaging and by virtue of the aforementioned design and construction, the parts will not hook together. They also meet the F.D.A. toy safety standards. The molding unit, when in the hands of the ultimate user, is readily converted for use by snipping or cutting the plurality of connecting strips 22 to thereby sever the ring-like member 20 from the rest of the container. When the ring-like member 20 is severed, it is adapted to form the handle, generally indicated at 30, for the frozen liquid product or confection. The ring-like member 20 is positioned between the inclined pins or posts 26 in the manner shown in FIG. 3 and since it is formed of a polyethylene material, can be readily bent from its annular preformed shape to the shape shown in FIG. 3 to extend between the uprights or posts 26 so that a looped portion 32 of same extends into the interior of the cup-shaped member or container and a looped portion 34 of said ring extends exteriorly of said cup-shaped member or container. The shape of the ring-like member 30, when positioned between the posts 26, assumes a generally hour glass configuration with the intermediate portion 36 being reduced with the opposite looped ends 32 and 34 being of a generally arcuate shape. The portion 32 of the ring-like member 30 which extends into the container is pressed downwardly more or less as shown in FIG. 5, whereas the looped portion 34 which extends exterior of the container extends laterally of the cup-shaped member. The inclined pins or posts 20 serve to keep the ring-like member 30 from moving or creeping upward while held between the posts. The corners or sharp edges of the ring-like member 30 also help in this respect. The liquid, which may be a flavored liquid, is then poured into the cup or container and the unit is placed in a freezing compartment of a refrigerator where it is hardened. After it is hardened, it will be seen that a portion 32 of the handle which extended into the liquid is frozen to the frozen liquid, while the portion 34 extending exteriorly of the cup-shaped member remains unaffected. The frozen liquid or confection in the cup-shaped member or container is removed therefrom by manually pressing or squeezing against the tapered side wall 13 of the cup-shaped member or container to cause the frozen or solid mass of the liquid to be ejected from the cup-shaped member or container. When ejected or removed, the frozen liquid or confection, generally indicated at 40, will be as shown in FIG. 6, with a portion of the handle extending exteriorly thereof to be grasped by the person. The person may then eat or suck on the frozen liquid and after it is consumed, the handle will still remain, so that it may be subsequently positioned as in FIG. 3 and permit another liquid to be frozen with the handle embedded therein. Thus, the container and the handle may be repeatedly reused. The configuration in relief on the bottom wall of the cup or container is impressed on the undersurface of the frozen liquid 40, thus enhancing the attractiveness of the finished consumable frozen product.

Figure 7:
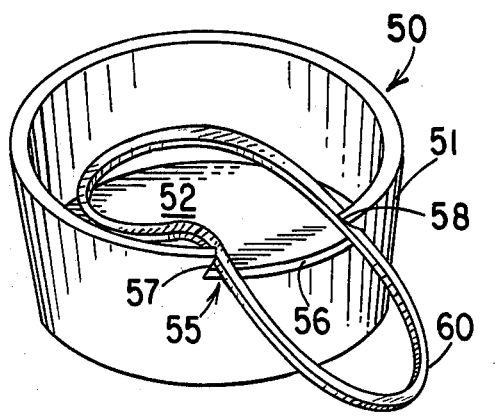
FIG. 7 is a perspective view of another embodiment of the one-piece molding unit forming this invention, wherein the ring handle has been removed and inserted in place in the notch provided to form a handle for the frozen confection.

Referring now to FIG. 7, there is disclosed an alternate construction 50, wherein the annular cup-shaped container 50 is formed with sloping walls 51 and a flat planar bottom 52. At the top edge of the wall 51, there is formed a notch 55 having a bottom edge 56 parallel to the rim of the container 50 and diagonally extending walls 57 with the top edge 58 thereof positioned inwardly with respect to the juncture between the walls 57 and the edge 56. The diagonally positioning of the walls 57 is necessary to maintain in place the ring 60 when it has been disconnected from the as molded piece illustrated in FIG. 1, and inserted in place to form a handle for the confectionary.

Figure 8:
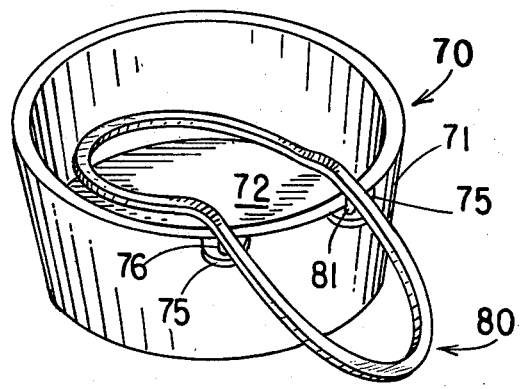
FIG. 8 is a perspective view of another embodiment of the one-piece molding with the ring removed from that of FIG. 1, and with the ring having rods extending outwardly therefrom positioned in tabs to form a handle for the frozen confection.

Referring now to FIG. 8, there is an alternative embodiment to that shown in FIG. 1, wherein the container 70 has inwardly sloping walls 71 joined by a flat planar bottom 72. At the rim of the wall 71 there are provided outwardly extending and spaced apart tabs 75 each provided with an aperture 76 therein. The tabs 75 are preferably parallel to the bottom 72. The ring 80 molded as an integral part of the container 70 is provided with two downwardly extending pins 81, each having a diameter adjusted to fit within the apertures 76 in the tabs 75. This construction provides the necessary positioning of the ring 80 in the container 70 to form a handle for a confectionary.

Figure 9:
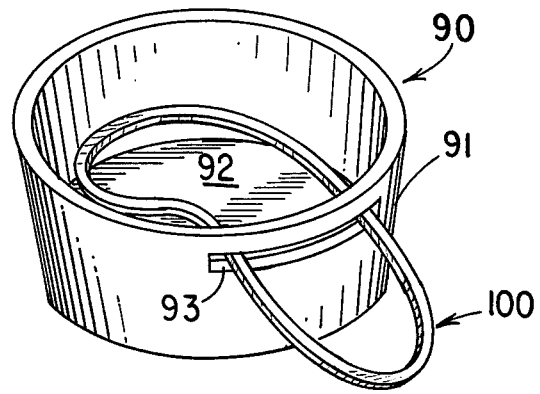
FIG. 9 is a perspective view of another embodiment of the one-piece molding with the ring removed from that of FIG. 1, and with said ring positioned in a slot to form a handle for the frozen confection.

Referring now to FIG. 9, there is disclosed a still other alternative design to the present invention, in which the container 90 having inwardly extending walls 91 joined by a flat planar bottom 92 receives the ring 100, when disconnected from the as molded piece, through a slot 93 positioned in the wall 91. The slot 93 is over sized with respect to the diameter of the ring 100 to permit the confectionary to be squeezed upwardly to pop same from the container 90 and to allow the handle 100 to be withdrawn through the over sized slot 93.

While there has been disclosed what at present is considered to be the preferred embodiments of the present invention, it will be appreciated that various modifications and alterations may be made therein without departing from the true spirit and scope of the present invention and it is intended to cover in the appended claims all such modifications and variations.

What is claimed is:

1. A molding unit for forming a frozen product, said unit comprising a flexible cylindrical container having a bottom and upstanding side wall with the edge thereof defining an opening, spaced apart rods on said side wall extending beyond the edge thereof away from said bottom, the portion of said rods extending beyond the side wall being angularly inclined toward each other with the arcuate extent between said rods being less than 120°, and a flexible and resilient ring circular in plan view detachably connected to said side wall at the edge thereof positioned externally of said rods and connected to said side wall at no more than three distinct points, whereby said flexible and resilient ring upon detachment from said side wall and placement between said spaced apart rods is retained thereby during freezing of liquid into the frozen product, deformation of said flexible container ejecting the frozen product therefrom with said flexible and resilient ring retained therein forming a handle for said frozen product.

* * * * *